(12) United States Patent
Eifert et al.

(10) Patent No.: US 10,889,197 B2
(45) Date of Patent: Jan. 12, 2021

(54) STATE OF CHARGE BATTERY MONITORING

(71) Applicant: FORD GLOBAL TECHNOLOGIES, LLC, Dearborn, MI (US)

(72) Inventors: Mark Eifert, Frankfurt am Main (DE); Birger Fricke, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 869 days.

(21) Appl. No.: 14/921,167

(22) Filed: Oct. 23, 2015

(65) Prior Publication Data

US 2016/0114696 A1 Apr. 28, 2016

(30) Foreign Application Priority Data

Oct. 23, 2014 (DE) .......................... 10 2014 221 547

(51) Int. Cl.
*H02J 7/00* (2006.01)
*B60L 58/12* (2019.01)
(Continued)

(52) U.S. Cl.
CPC ........... *B60L 58/12* (2019.02); *B60L 11/1861* (2013.01); *B60L 53/20* (2019.02); *B60L 53/665* (2019.02); *B60L 58/22* (2019.02); *H02J 7/007* (2013.01); *H02J 7/0029* (2013.01); *H02J 7/0047* (2013.01); *B60L 2240/547* (2013.01); *B60L 2250/10* (2013.01); *H02J 7/00304* (2020.01);
(Continued)

(58) Field of Classification Search
CPC .............. B60L 11/1861; B60L 11/1811; B60L 11/1848; B60L 11/1859; H02J 7/0007; H02J 7/0029; H02J 2007/004; H02J 2007/0039; H02J 7/0031; H02J 2007/0037; H02J 7/0047; Y02T 10/7044; Y02E 60/12; H01M 10/48
USPC ........................................................ 320/134
See application file for complete search history.

(56) References Cited

U.S. PATENT DOCUMENTS 4,460,870 A * 7/1984 Finger ................ G01R 31/3835
324/429
4,937,528 A 6/1990 Palanisamy
(Continued)

FOREIGN PATENT DOCUMENTS

EP 1 321 773 A1 6/2003
EP 1598913 B1 11/2005
(Continued)

*Primary Examiner* — Nathaniel R Pelton
*Assistant Examiner* — Mohammed J Sharief
(74) *Attorney, Agent, or Firm* — Frank Lollo; Brooks Kushman P.C.

(57) ABSTRACT

Methods for monitoring the state of charge of a battery of a motor vehicle are disclosed in which the battery current is determined at moments at which the battery charging voltage has decreased to a defined limit value. The battery current thus determined is transmitted to an evaluation unit, which generates an alarm signal if no discharge of the battery is measured by means of the determined battery current in a defined period. The limit value for the decrease of the battery charging voltage is selected such that the algorithm as a result can identify whether the state of charge of a battery lies above or below a threshold above which a certain electrical functionality of the battery can be guaranteed.

16 Claims, 6 Drawing Sheets

(51) Int. Cl.
    *B60L 11/18*     (2006.01)
    *B60L 53/20*     (2019.01)
    *B60L 53/66*     (2019.01)
    *B60L 58/22*     (2019.01)

(52) U.S. Cl.
    CPC .......... *H02J 7/00306* (2020.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | |
|---|---|---|---|
| 5,166,595 A | | 11/1992 | Leverich |
| 5,331,268 A | * | 7/1994 | Patino .................. H02J 7/008 320/158 |
| 5,659,237 A | * | 8/1997 | Divan .................. H02J 7/0018 320/119 |
| 5,900,734 A | * | 5/1999 | Munson ........... G01R 19/16542 324/433 |
| 6,373,229 B1 | * | 4/2002 | Slusky ................. H02J 7/0042 320/165 |
| 6,414,465 B1 | | 7/2002 | Banks et al. |
| 6,424,157 B1 | | 7/2002 | Gollomp et al. |
| 6,861,842 B2 | | 3/2005 | Baeuerlein et al. |
| 7,355,411 B2 | | 4/2008 | Murakami et al. |
| 7,554,296 B2 | | 6/2009 | Mizuno et al. |
| 7,679,328 B2 | | 3/2010 | Mizuno et al. |
| 7,990,111 B2 | | 8/2011 | Mizuno et al. |
| 8,773,136 B2 | | 7/2014 | Fricke et al. |
| 2001/0009371 A1 | * | 7/2001 | Podrazhansky .... G01R 31/3835 324/432 |
| 2006/0012338 A1 | * | 1/2006 | Etzold ................... H02J 7/0075 320/125 |
| 2007/0114950 A1 | * | 5/2007 | Matsumura ....... H02M 3/33507 315/274 |
| 2008/0042615 A1 | * | 2/2008 | Serrels .................... B60L 1/003 320/101 |
| 2012/0065824 A1 | * | 3/2012 | Takahashi ............ G01R 31/361 701/22 |
| 2013/0062955 A1 | * | 3/2013 | Suzuki ................ H01M 2/1022 307/77 |
| 2013/0207592 A1 | * | 8/2013 | Okada ..................... B60L 58/15 320/106 |
| 2013/0293007 A1 | * | 11/2013 | Tagami ..................... B60K 6/46 307/10.1 |
| 2014/0239908 A1 | * | 8/2014 | Ichikawa .............. H02J 7/0016 320/134 |

FOREIGN PATENT DOCUMENTS

| | | | |
|---|---|---|---|
| EP | 1 503 219 | 11/2007 | |
| EP | 2645117 A1 | * 10/2013 | ......... G01R 31/3682 |

\* cited by examiner

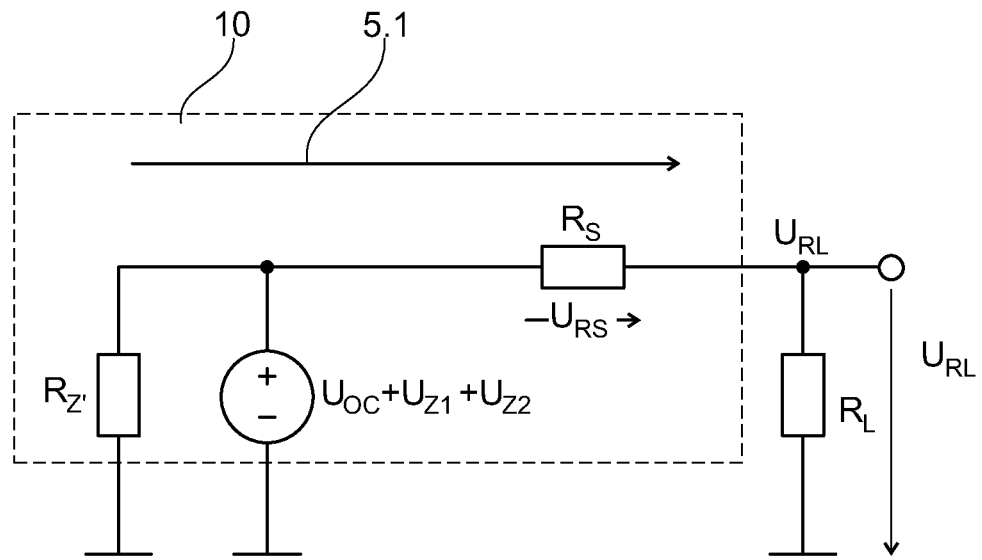
Fig. 5
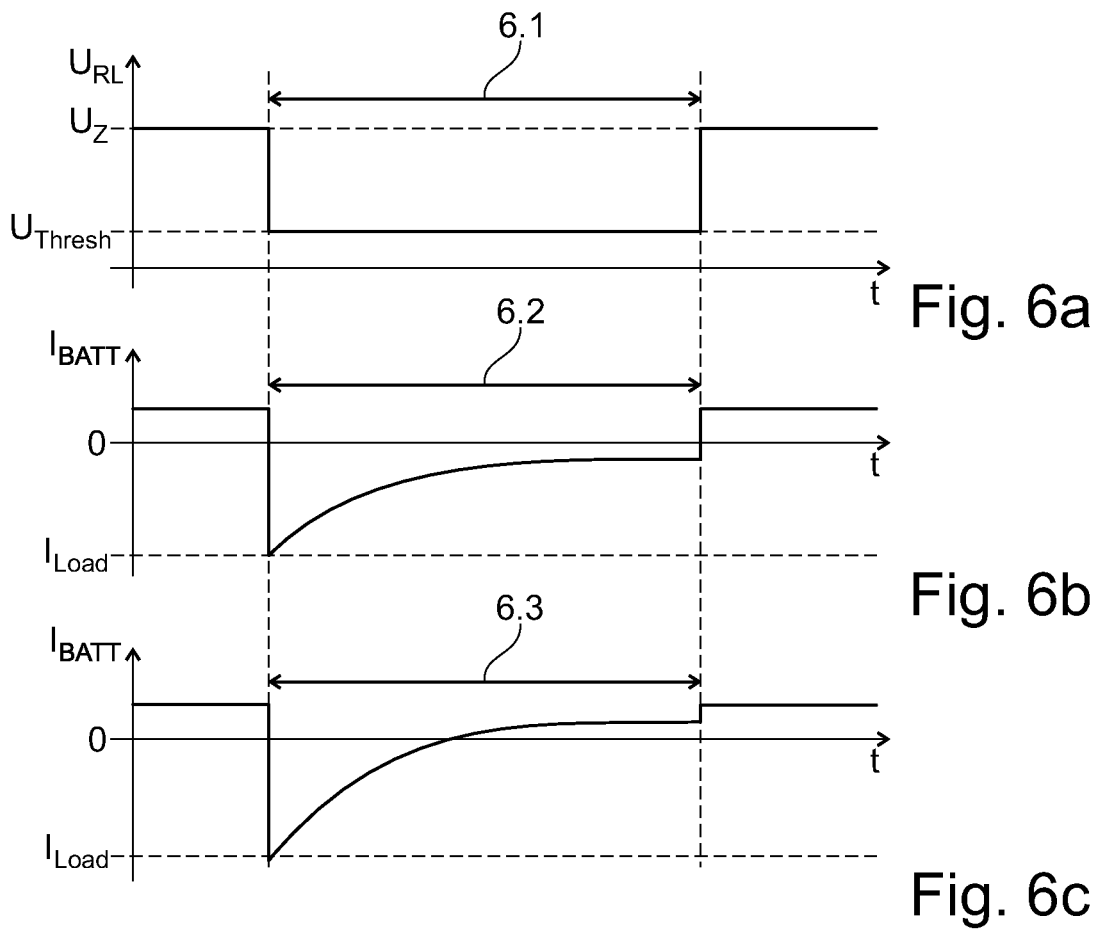
Fig. 6a
Fig. 6b
Fig. 6c

STATE OF CHARGE BATTERY MONITORING

CROSS-REFERENCE TO RELATED APPLICATION

This application claims foreign priority benefits under 35 U.S.C. § 119(a)-(d) to DE 10 2014 221 547.1, filed Oct. 23, 2014, which is hereby incorporated by reference in its entirety.

TECHNICAL FIELD

This disclosure relates to a method for monitoring the state of charge of a battery of a motor vehicle. The monitored battery is in particular a lead accumulator of a motor vehicle.

BACKGROUND

The starter battery of a motor vehicle is an accumulator that delivers the electrical current for the starter motor of an internal combustion engine. The battery of an electric vehicle, which serves to drive the vehicle, is referred to by contrast as a fraction battery. In addition, electric vehicles or hybrid vehicles may also have a starter battery. By way of example, lead accumulators can be used as batteries, however these will also be referred to hereinafter as lead batteries.

Batteries of this type of a vehicle are continuously charged and discharged. The charging is performed by way of example via an alternator or in the case of plug-in electric vehicles by connecting the vehicle to a local power supply. Here, various strategies for the management of automotive power supplies may be implemented. Strategies for controlling alternators which adjust the power generation to phases of operation of the drivetrain during which electrical energy costs less or even nothing must maintain a battery state of charge (SOC) that lies below the full state of charge and above a minimum state guaranteeing electrical functionality. A battery monitoring system which estimates the state of charge or identifies high or low states of charge must therefore ensure that the battery is always sufficiently charged in order to ensure its functionality.

Strategies for controlling low-voltage systems (12 V) for plug-in hybrid vehicles (PHEVs) and electric vehicles (BEVs) form a second class of strategies for controlling the power supply. They may activate equalization charging and trickle charging depending on a certain time schedule, vehicle mode or electrical loads that are activated. Such strategies likewise require the monitoring of the battery state of charge, in particular because trickle charging is to some extent a state of charge condition that may quickly deteriorate to a low state of charge.

By way of example battery monitoring systems known from the prior art use Hall sensors or shunt resistors, which in each case are attached directly to a battery pole. However, this entails certain limitations or requirements for the encapsulation and arrangement of the battery. The measured battery current is then typically integrated in real time and added to a starting value in order to estimate the current state of charge. The result is thus a continuously calculated value, which should estimate the actual state of charge.

Shunt resistors may be very accurate over a wide range of current values. They are therefore suitable for the measurement of the battery current during vehicle operation and during parking phases, but are relatively costly. Hall sensors are less costly, but are usually designed for the precise measurement of current only within a limited range. Their accuracy may limit the accuracy of the estimation of the state of charge. This is then the case in particular when the sensor is dimensioned to measure high or medium currents, but the vehicle remains parked for a long period of time with low, yet nevertheless significant loads.

The starting value used in conjunction with current integration may be determined by measuring the open-circuit voltage of the battery and with use of a stored correlation (look-up table), once the battery has been dormant for a number of hours without significant charging or discharging current. This can be considered to be a re-calibration of the state of charge that was determined during the previous journey. However, periodic or constant loads hinder this initial estimation. Other implementation concepts operate with a measurement of the battery voltage whilst the battery is discharged with a known high load, for example during the spinning of the starter, in order to estimate the initial state of charge.

The first method, which uses the open-circuit voltage of the battery, cannot be used reliably in a plug-in vehicle (PHEV or BEV). This is also true for conventional vehicles, such as taxis or police patrol cars, which are driven the entire night by different drivers. In the case of PHEVs and BEVs, if the vehicle is charged at the mains over a period of time of a number of hours, there is no guarantee that there is sufficient time for the open-circuit voltage to reach a stable state before the next journey. This is to be attributed to the fact that the electrical architectures of known power supplies do not separate the lead battery from the low-voltage current source during the charging of the traction battery at the mains. If insufficient dormant time has elapsed in order to measure the open-circuit voltage in the stable state, the final estimation of the state of charge calculated during the last journey can be used as a starting value. However, the accuracy is impaired as a result.

Lastly, the costs of a battery monitoring sensor (BMS) have to be recouped by the function thereof. The main function of a battery monitoring sensor lies in monitoring the capability of the battery to deliver electrical current on demand at minimum voltage levels. However, a disadvantage of the use of a current integration method for estimating the electrical functionality of the battery lies in the fact that the current output capability of the battery is not always reflected by the state of charge, even if the SOC is known accurately. This is then particularly the case when the battery has aged.

The above-described accuracy problems, together with cost considerations and design stipulations caused by conventional battery monitoring sensors, lead to a need for new battery monitoring technologies.

EP 1 321 773 A1 discloses, by way of example, a method for determining the remaining capacity of a battery, in which a correlation between the remaining capacity of the battery and four parameters is used. The parameters include the internal resistance of the battery, the temperature, the discharging current and the open-circuit voltage or the discharging voltage. The correlation between these parameters is determined by measurement, and from this one or more graphs is/are created. The associated remaining capacity of the battery is determined from the graphs on the basis of at least two varying parameters, which are measured during the operation of the battery. EP 1 503 219 uses a method in which the correlation between a remaining capacity of the battery and measured parameters is deduced from a reference table. The remaining capacity of a battery is also to be determined with high accuracy with methods as disclosed for example in U.S. Pat. Nos. 7,355,411 or 7,990,111.

SUMMARY

It should be noted that the features specified individually in the claims can be combined with one another in any technically feasible manner and illustrate further embodiments.

In a method for monitoring the state of charge of a battery of a motor vehicle the battery current is determined at moments in time at which the battery charging voltage is decreased to a defined limit value. The battery current thus determined is transmitted to an evaluation unit, which generates an alarm signal should no discharge of the battery be measured by means of the determined battery current for a defined monitoring period. Here, the limit value for the battery charging voltage is selected such that the battery discharges when the state of charge of the battery lies above a defined threshold. The used monitoring period may be a fixedly defined value or may be adapted continuously to the current state of the battery. The battery monitored in this way is thus a lead battery in particular.

The limit value for the decrease of the battery charging voltage is selected such that the algorithm as a result can identify whether the state of charge of a battery lies above or below a threshold above which the electrical functionality of the battery can always be guaranteed. However, the algorithm here identifies only discrete states of charge, since it only determines whether the state of charge is high and low with respect to the threshold. This means that it detects discrete states instead of estimating an exact state of charge as accurately as possible.

Instead of calculating an estimation of the state of charge continuously, the algorithm outputs a signal that identifies whether the state of charge lies above or below a predefined threshold. If no discharge is measured within a defined period of time following the decrease of the battery charging voltage, this means that the state of charge lies below the threshold and thus is insufficient. If, by contrast, a discharge is determined, this means that the state of charge lies above the threshold and is sufficiently high. The method thus only determines a low or high state of charge, however this is sufficient for typical charging and stop-start control strategies, which aim to minimize the fuel consumption. This is also sufficient for strategies for the power supply management of plug-in vehicles designed to maintain a long battery service life and to maximize the range of the electric drive.

The algorithm therefore also does not carry out an initial estimation of the state of charge following a long dormant period, which would otherwise entail the previously mentioned problems. The algorithm may also be implemented without a pole-mounted battery current sensor and/or battery voltage sensor.

The measured values may be transmitted directly or indirectly to the evaluation unit from a sensor. Furthermore, the evaluation unit does not have to be an independent module, since its functionality can also be formed by the cooperation of a number of individual modules.

A high or low state of charge with respect to a threshold is determined by monitoring the battery current whilst the voltage at the battery terminals is reduced, at least for a moment, to a voltage corresponding to the calibrated threshold. Here, battery current can be determined directly or also indirectly by measuring the output current of a current source by means of which the battery is charged. This current source in particular is a generator (for example an alternator) or a DCDC converter of the motor vehicle. If the output current of the alternator or of the DCDC converter falls to zero whilst the voltage drop occurs, it may be assumed that the total low-voltage current is delivered by the battery. The battery discharge time can thus be determined by monitoring the output current of the alternator or of the DCDC converter, and no separate battery current sensor is required.

Should the algorithm for monitoring the state of charge be implemented in conjunction with strategies for power supply management which periodically raise and lower the voltage setpoint value, the monitoring may take place when the setpoint value is reduced in this way. This may be the case by way of example when the battery charging voltage is increased on account of a charging strategy, if defined conditions are present, and the battery charging voltage is decreased again to the defined limit value when these defined conditions are no longer present. These defined conditions by way of example may include a high efficiency of the energy conversion of the drivetrain of the motor vehicle or good conditions for regenerative braking.

If, however, such changes of the voltage setpoint value take place too seldom or even not at all, the algorithm may also periodically induce the necessary voltage reductions. In one embodiment the battery charging voltage is therefore decreased in accordance with a schedule at regular intervals to the defined limit value. Thus, periodic voltage reductions of short duration may be planned, which serve merely for the purpose of the regular monitoring of the state of charge.

If, by means of the alarm signal of the evaluation unit, an excessively low state of charge of the battery is identified, a measure for changing the battery situation can be initiated by the motor vehicle. This measure in particular includes the initiation of a process of charging the battery to a maximum state of charge, which should lie as close as possible to 100%. If the algorithm is combined with a preferred charging strategy, this may mean that the high battery voltage setpoint value is to be retained, this otherwise being reserved for operating phases of the vehicle with very high efficiency or regenerative braking. If the algorithm by contrast is integrated in a charging strategy in which a switch is made in accordance with a schedule at regular intervals between trickle charging and equalization charging, an unscheduled change from trickle charging to equalization charging can be initiated for this purpose in accordance with an exemplary embodiment. This is preferably maintained until the battery is sufficiently recharged.

In the event of equalization charging a voltage setpoint value is used that facilitates complete charging of all cells in a lead accumulator. It is normally defined in a manner dependent on temperature and frequently, such that the gas development rate lies below a maximum design value in the middle of the defined temperature range. This temperature-dependent charging voltage is filed in a table by means of what is known as the z-curve. The z-curve, which defines the equalization charging, can be obtained from the battery manufacturer or may be defined by the vehicle manufacturer in order to function well in a given target vehicle with a predicted use profile. The z-profile defines the voltage at the connection terminals of the battery.

By contrast, trickle charging is a control strategy for the voltage setpoint value of a motor vehicle power supply that minimizes the battery current and maintains the battery state of charge at or around a fixed value. Trickle charging may be performed in one of two ways: as a temperature-dependent voltage that is defined at the battery connection terminals or as a current control strategy that controls the voltage setpoint value of the power supply (DCDC converter or generator) in such a way that the battery current remains zero. The last embodiment may be referred to as zero-current control, since it controls the voltage setpoint value in such a way that the battery current is equal to zero.

Because the method does not require any periods of time in which no voltage is fed into the battery for recalibration in order to correct current integration faults, it may additionally be applied in plug-in hybrid and electric vehicles, which can be plugged into the mains and can be charged or can travel for the majority of a day.

The field of application may also be extended such that the method is applied for example in aircraft, boats and stationary power supplies (for example domestic power supplies) which use lead batteries for energy storage. Aircraft and boats are often operated either between target locations, or are stood on a runway or are moored at docks, where the batteries are charged by an external current source. Their operating cycles are similar to those of a plug-in motor vehicle in that a continuous charging voltage is fed into their batteries. Stationary domestic power supplies that are fed by solar and wind energy and use lead batteries for energy storage may have similar operating cycles.

BRIEF DESCRIPTION OF THE DRAWINGS

FIG. 5 shows the illustration of a Thevenin equivalent circuit diagram of a complete battery module;

FIG. 6A shows a graph for illustrating the AC side voltage over time during the control of the voltage setpoint value;

FIG. 6B shows a graph for illustrating the battery current over time with a high state of charge of the battery;

FIG. 6C shows a graph for illustrating the battery current over time with a low state of charge the battery;

DETAILED DESCRIPTION

Figure 1:
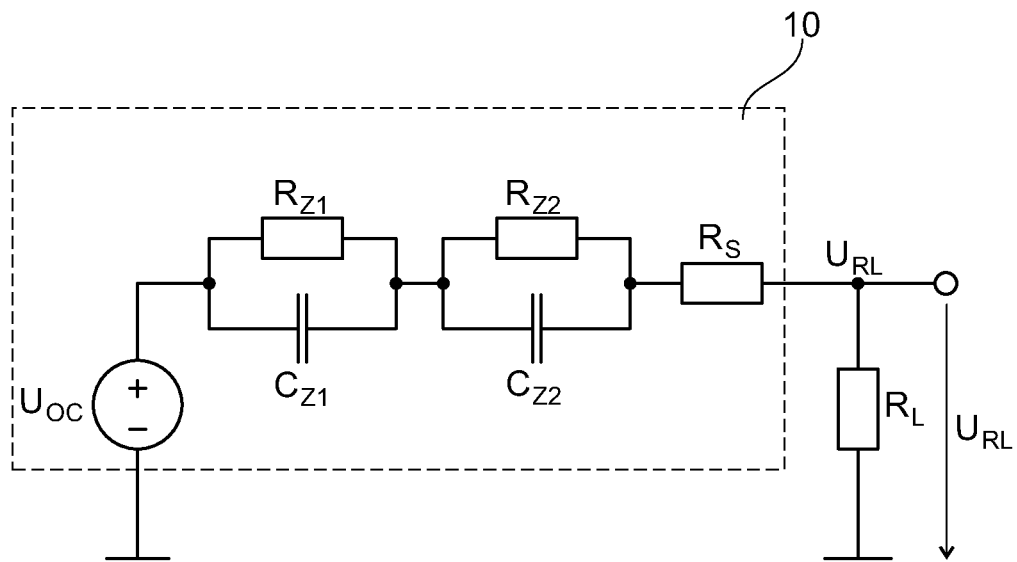
FIG. 1 shows the illustration of an equivalent circuit diagram for the discharging of a lead battery via a load.

The principle forming the basis of the method of comparing the state of charge of a battery with a calibrated threshold is illustrated in FIG. 1 on the basis of an equivalent circuit diagram for a lead battery. The equivalent circuit diagram shows a battery 10, which is discharged by a load $R_L$. The battery module consists of a voltage source, of which the voltage $U_{OC}$ corresponds to the open-circuit voltage when the battery has remained dormant for a long period of time and is in a state of equalization, two ZARC elements, and a series resistor $R_S$, which is not constant, but is dependent on the state of charge and the temperature. The ZARC elements each consist of a non-linear resistor $R_{Zn}$, which is connected in parallel to a constant phase element, which is approximated by a capacitor $C_{Zn}$. A model having more than two ZARC elements may also be used in order to better approximate an actual battery characteristic curve, however the principle behind the SOC threshold identification can be explained with one or two elements.

Figure 2:
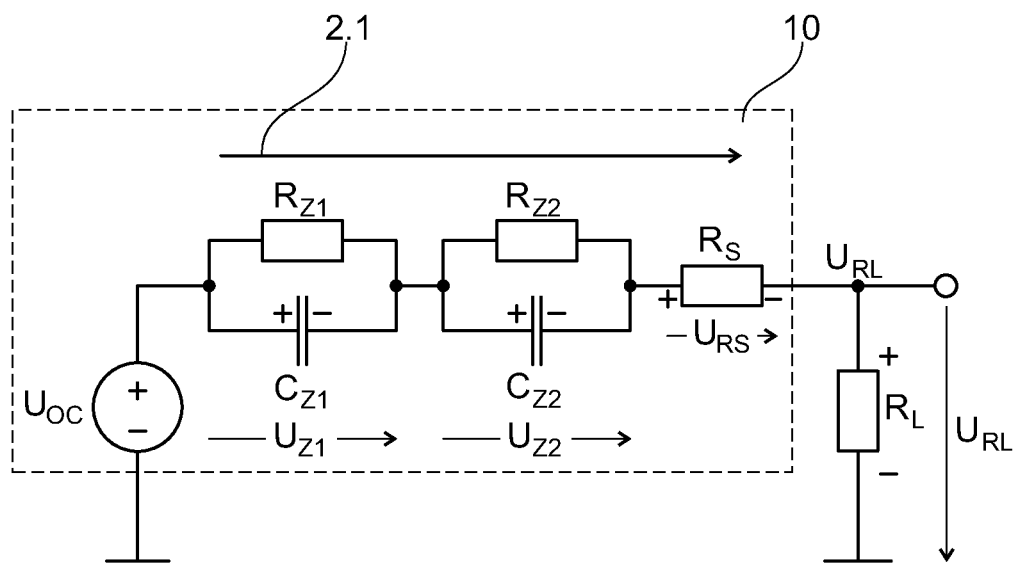
FIG. 2 shows the illustration of the polarization of ZARC elements in the event of discharging by a load.

The ZARC elements constitute polarization effects in the battery that influence the impedance spectrum thereof. Before the load is separated from the battery the AC side voltage is the sum of the open-circuit voltage $U_{OC}$, the voltages at the ZARC elements, and the voltage at the series resistor $R_S$. When the load is separated from the battery, the battery gradually enters a state of equalization, which is simulated in the model in that the virtual capacitors $C_{Z1}$ and $C_{Z2}$ discharge over the non-linear resistors $R_{Z1}$ and $R_{Z2}$ until the open-circuit voltage at the terminal is equal to $U_{OC}$. The polarization of the virtual capacitors $C_{Z1}$ and $C_{Z2}$ is dependent on the sign of the current flow. If a discharge occurs, as is illustrated in FIG. 2, the capacitors have the same polarity as the open-circuit voltage source. This means that the positive side of the voltage source is connected to the positive side of the chain of ZARC elements. As a result the battery connection voltage is lower than the open-circuit voltage. The direction of the current flow is characterized in FIG. 2 by an arrow 2.1.

When the battery is charged by an external current source the polarization of the ZARC elements is reversed. The negative side of the chain of ZARC elements is connected to the positive side of the voltage source $U_{OC}$, and as a result of this the AC side voltage is higher than the open-circuit voltage. The AC side voltage $U_{OC}$ is a function of the state of charge and temperature. The function $U_{OCV}(SOC,T)$ is determined approximately linearly with respect to the state of charge and can be determined by bench tests for the calibration of the algorithm.

Figure 3:
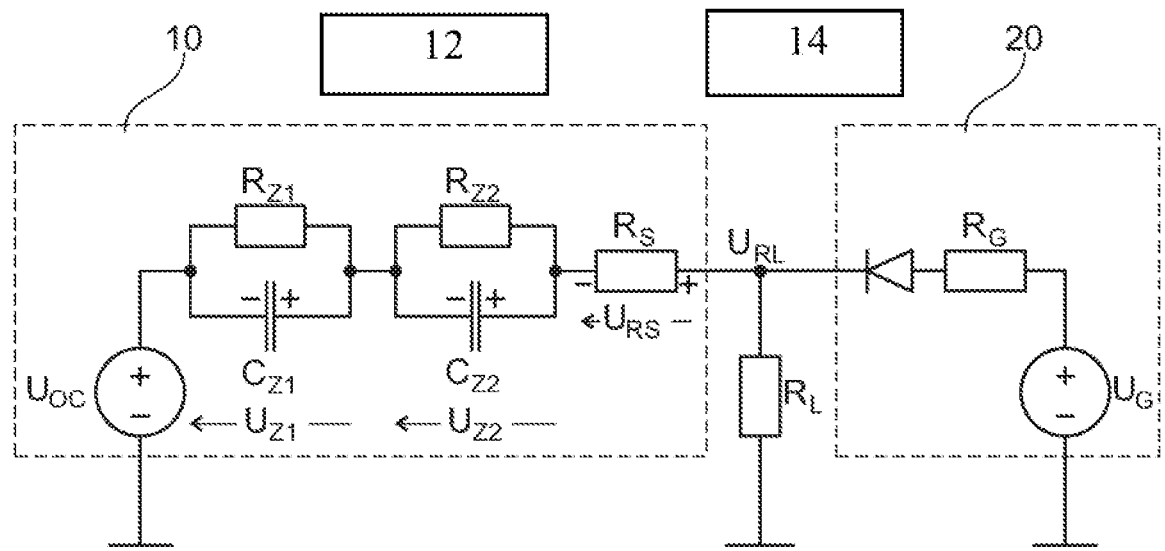
FIG. 3 shows the illustration of the polarization of ZARC elements in the event of charging of a battery by an external current source.

If the battery 10 is charged by an external current source 20, such as an alternator or a DCDC converter, the battery AC side voltage is significantly greater than the open-circuit voltage $U_{OC}$, and the ZARC elements are polarized as illustrated in FIG. 3. FIG. 3 also shows controller 12 and evaluation unit 14. The voltage setpoint value of the alternator or of the DCDC converter is always controlled such that a defined voltage is applied at the battery terminals. The simplified model illustrated in FIG. 3 does not contain a wiring resistor between the battery 10 and the current source 20, and therefore the battery AC side voltage is identical to the voltage at the electrical loads $U_{RL}$. In the analysis the setpoint value of the power supply should preferably be defined with respect to the battery AC side voltage.

In order to determine whether the state of charge of the battery lies above or below a limit value for the state of charge (SOC) of the battery, the voltage setpoint value of the current source is reduced to a voltage that corresponds to the SOC value and the battery temperature $U_{OCV}(SOC, T)$:

$$U_{Setpoint} = U_{RL} = U_{OCV}(SOC,T). \tag{1}$$

In the moment after which the voltage setpoint value has been reduced, the sum of the actual internal open-circuit voltage $U_{OC}$ and of the voltages at the ZARC elements is greater than the setpoint value:

$$U_{OC} + U_{Z1} + U_{Z2} > U_{RL}. \tag{2}$$

At the moment immediately after the reduction of the setpoint value, a battery discharge must take place on account of the imbalance expressed in equation (2). The energy which is stored in the battery and which is discharged can be divided into two categories: the chemical potential energy (of which the quantity is expressed by $U_{OC}$), which is converted into electrical current, whilst lead sulfate and water are formed via redox reactions, and the energy that is stored in the virtual ZARC capacitors and that is characterized by $U_{Z1}$ and $U_{Z2}$, which constitute polarization effects.

Figure 4:
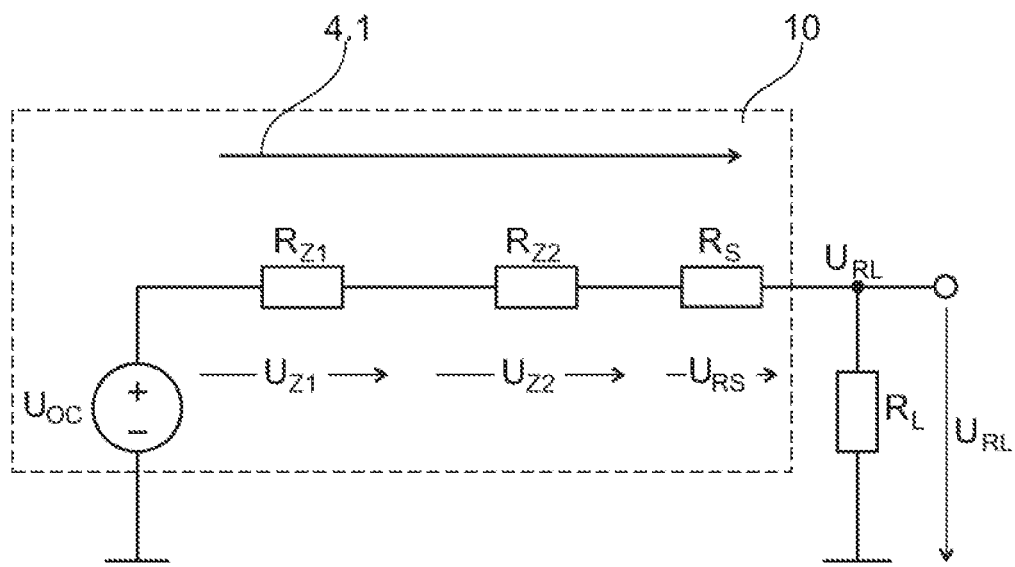
FIG. 4 shows the illustration of the impedance of the battery in a quasi-stable state during discharge.

The internal resistance of the redox-protected chemical potential energy source at the battery terminals is the same as the impedance of the battery in a quasi-stable state during discharge. As illustrated in FIG. 4, it is the sum of the series battery resistor $R_S$ and the (non-linear) ohmic ZARC components $R_{Z1}$ and $R_{Z2}$. Here, the direction of the flow of current is characterized in FIG. 4 by an arrow 4.1.

The internal resistance between the energy buffer characterized by the virtual capacitors contained in the ZARC elements and the battery terminals contains only the series battery resistor $R_S$. This is illustrated in the Thevenin equivalent circuit of the complete battery model in FIG. 5, wherein here the direction of the current flow is characterized by an arrow 5.1.

Because the internal resistance of the energy buffer illustrated by the virtual capacitors in the ZARC elements is smaller than that of the chemical potential energy, which is characterized by $U_{OC}$, a drop in the voltage at the battery terminals to a setpoint value that is smaller than $U_{OC}$ leads to a complete discharge of the virtual capacitors by the load $R_S$, before current is generated via the redox reactions. The polarization of the capacitors, as illustrated in FIG. 3, must therefore be reversed if $U_{OC}$ is greater than the voltage setpoint value. If this is the case they must assume the opposite polarization, as illustrated in FIG. 2, before the (charging) current flowing into the battery is measured.

If the battery charging current is thus measured before the capacitors are completely discharged, it can be assumed that the discharge process has been stopped prematurely, because the voltage setpoint value is greater than $U_{OC}$, which means that the state of charge of the battery lies below the threshold defining the setpoint value.

This state of charge comparison method is based on the concept of determining whether the capacitors in the model, which constitute polarization effects, are completely discharged and charged again with an opposite polarity when the voltage setpoint value is reduced to a value corresponding to a threshold in the state of charge. This may be achieved by algorithms with varying degrees of accuracy. In its most basic form, an algorithm checks whether the battery can support a load without the aid of the rest of the power supply (alternator or DCDC converter) when the voltage setpoint value of the power supply is reduced to a calibrated value.

In order to determine whether the virtual capacitors in the ZARC elements, which constitute polarization effects, are completely discharged and re-polarized when the voltage setpoint value reduces, the battery current that is required to completely discharge the capacitors can be monitored over time. If, during this period, only the discharging current of the battery is measured, it can be assumed that the capacitors likewise have been fully discharged and that their polarity has changed with respect to their previous states during the charging. The estimated discharge time is thus used to determine the length of the voltage reduction and of the monitoring period.

Whereas the battery current can be monitored by a series of conventional means with good accuracy, the accuracy of the discharge time may be lower. This is due to inaccuracies when estimating the values of the virtual capacitors in the ZARC elements, which are a function of the voltage at the ZARC element (energy and battery current stored in the ZARC element), the state of charge of the battery, and the temperature.

A current monitoring period is preferably selected that is slightly longer than the maximum possible discharge time in order to thus compensate for the inaccuracies in the calculation of an accurate discharge time and in order to avoid missing an identification of a low state of charge condition. Once the virtual capacitors have been completely discharged, the circuit enters a transition phase, which ultimately ends with the disappearance of the discharging current. Provided a discharging current is measured during the entire time required to discharge the capacitors and any discharge is measured in the transition phase once the capacitors have changed polarization, it can be assumed that the state of charge of the battery exceeds the threshold.

The following conditions can be used by an algorithm in order to identify the relationship between the state of charge of a battery and a threshold:
A complete discharge of the capacitive parts of the ZARC elements is a necessary precondition for the fact that the state of charge of the battery may exceed the threshold.
The measurement of the battery discharging current in the transition phase, once the capacitive elements have been discharged, is a sufficient precondition for the fact that the state of charge of the battery may exceed the threshold.

In accordance with the most fundamental implementation concept, a constant monitoring period can be selected that is longer than the maximum possible discharge time for a certain battery. The voltage setpoint value is periodically reduced for at least the monitoring period, and the battery current is monitored. If only discharge battery current is measured, there is a sufficient precondition to identify a state of charge that is greater than the threshold. If the battery starts to charge during this time, its state of charge may thus be lower than the calibrated threshold. The identification of a low state of charge is thus conservative: false positive identifications are possible, whereas false negative identifications that detect no low SOC condition are designed to occur seldom.

The state curves for the voltage and the current during a monitoring period for batteries with a state of charge above and below a calibrated threshold are illustrated in FIGS. 6A, 6B and 6C. FIG. 6A shows the terminal voltage/AC side voltage $U_{RL}$ plotted over time t with a control of the voltage setpoint value. FIG. 6B shows the battery current $I_{Batt}$ plotted over time t with a high state of charge SOC of the battery (SOC>$SOC_{Thresh}$) whereas FIG. 6B shows the battery current $I_{Batt}$ plotted over time t with a low state of charge SOC of the battery (SOC<$SOC_{Thress}$). The region 6.1 in FIG. 6A characterizes a monitoring period, whereas the region 6.2 in FIG. 6A characterizes complete discharge and the region 6.3 in FIG. 6C characterizes incomplete discharge.

In FIG. 6A the voltage setpoint value $U_Z$ corresponds to the temperature-dependent equalization charging voltage, and $U_{Thresh}$ corresponds to the calibrated threshold SOC-$_{Thresh}$, as defined in equation (1). The battery charging current is defined as positive, and the discharging current is defined as negative. FIG. 6B illustrates the current curve of a battery with a state of charge that lies below the threshold because (positive) charging current is measured during the monitoring period. By contrast, FIG. 6C illustrates the current curve of a battery with a state of charge that lies below the threshold because (positive) charging current is measured during the monitoring period.

In order to implement the state of charge comparison method it is necessary to reduce the voltage at the battery from a voltage that guarantees a charging current (which flows into the battery) to a voltage setpoint value that is a function of the state of charge threshold used for a comparison. There are at least two possibilities for this purpose. One possibility lies in periodically reducing the voltage setpoint value on the basis of a timer, and a further possibility lies in coordinating monitoring periods with reductions of the voltage setpoint value that take place during regenerative braking or other interactions between vehicle controllers and the voltage setpoint value.

The negative gradient of the voltage reduction from the charging voltage to the voltage corresponding to the state of charge threshold should be selected to be large enough so that it does not limit the charging current during a discharge, but also does not cause any visible flickering of lamps or audible changes to the fan speeds in the vehicle. The positive gradient, which corresponds to a return to the equalization charging voltage, is limited only by voltage quality considerations: flickering lamps and audible changes of the fan speeds.

Figure 7:
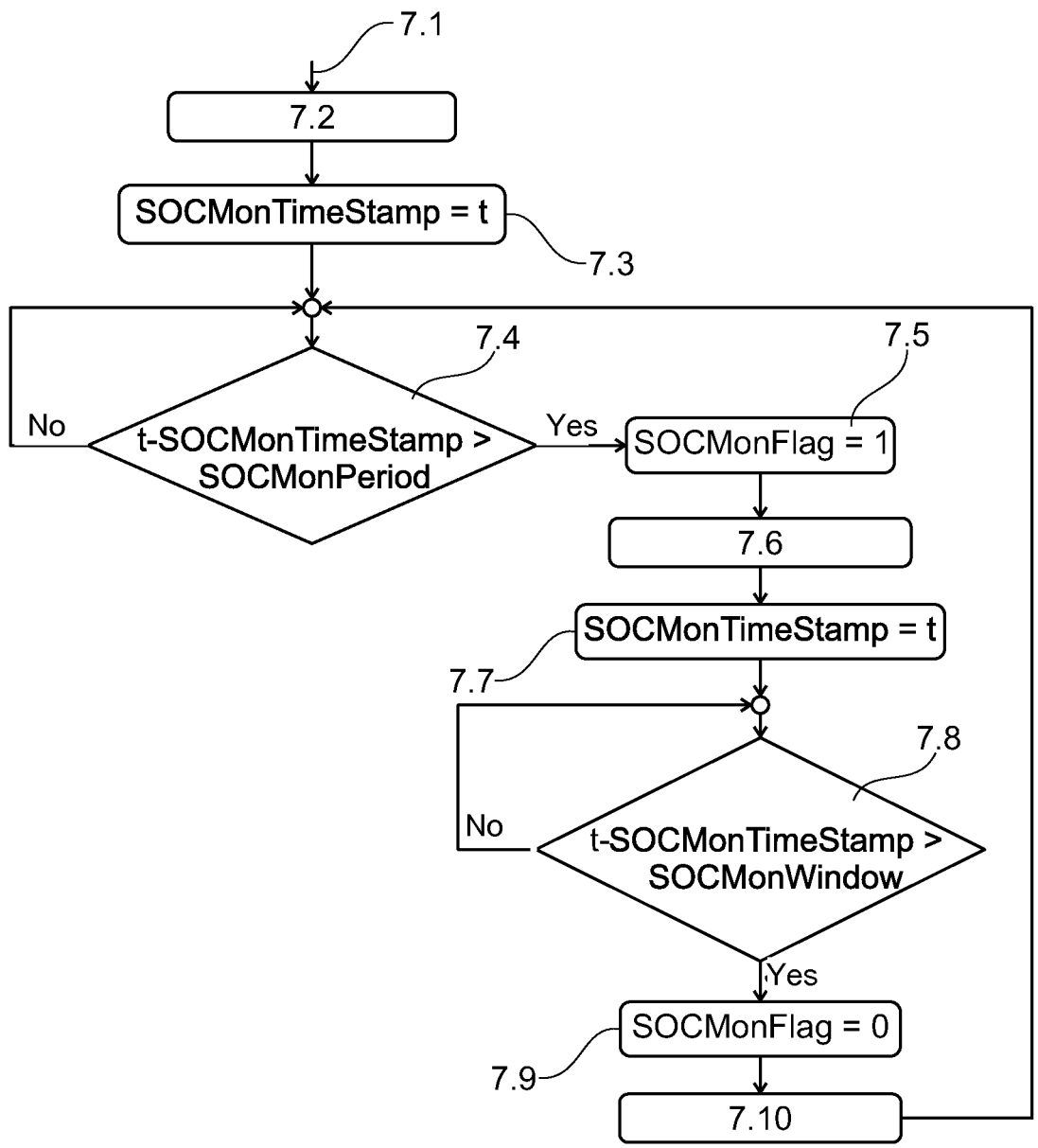
FIG. 7 shows a flow diagram of an algorithm with periodically generated voltage reductions.

A periodic reduction of the voltage setpoint value by means of a timer-based algorithm is illustrated in FIG. 7. Once the power supply of the vehicle is activated in step 7.1, the temperature-dependent equalization charging voltage is applied. This voltage is designated in FIG. 7 as $U_{EQ}$, such that the voltage setpoint value in step 7.2 is set to $U_{EQ}$. The current time is also recorded, and in step 7.3 is stored in the variable timestamp SOCMonTimeStamp. When the time elapsed since the recording of the timestamp exceeds the calibrated variable SOCMonPeriod (step 7.4), the battery monitoring period starts and is accompanied by a voltage reduction. The flag (the variable) SOCMonFlag, which specifies that a monitoring period has started, is set in step 7.5 to High (=1), and the voltage setpoint value is set in step 7.6 to the value $U_{Thresh}$. This value $U_{Thresh}$ corresponds to the state of charge threshold described in equation (1). In addition, the value of the variable SOCMonTimeStamp in step 7.7 is reset to the current time t. This time is used as a reference in order to determine when the monitoring period ends and the next begins.

As soon as the check in step 7.8 reveals that the time since the start of the monitoring period exceeds the calibrated threshold SOCMonWindow, the value of the SOCMonFlag is reset to zero (step 7.9), and the voltage setpoint value is set again in step 7.10 to the equalization voltage. The monitoring period may be quite short, wherein the value of SOCMonWindow in typical automotive applications may be less than 20 seconds.

A new monitoring period is started when the difference between the current time t and the value stored as SOCMonTimeStamp again exceeds the calibrated value SOCMonPeriod. This value can be calibrated in order to trigger a monitoring period (depending on the application) every few hours or a number of times within the hour. The variable flag SOCMonFlag is used here in order to trigger the battery current monitoring algorithm. When it is set to High (=1), the monitoring should be started and retained over the estimated or calibrated discharge time.

Monitoring periods may additionally be coordinated with changes to the voltage setpoint value taking place during regenerative braking or other interactions between vehicle operating elements and the voltage setpoint value. If these take place often enough, it is possible to dispense with the generation of periodic voltage reductions. Here, voltage reductions caused by a power supply management strategy that implements regenerative braking and selected charging with the SOC monitoring algorithm described here are coordinated with the algorithm.

In order to monitor the battery current following a voltage reduction, a direct measurement or an indirect monitoring can be implemented. The direct measurement may be performed by a standard Hall sensor or shunt resistor. However, the costs of the sensor can be saved by monitoring the battery current indirectly via the output current of the alternator or of the DCDC converter, which in either case acts as the primary current source.

The SOC identification algorithm merely requires that the sign of the battery current indicate a charging or discharging state. The magnitude of the current is not used. Under the assumption that electrical current for supplying electrical loads must come either from the primary electrical current source (alternator or DCDC converter) or the battery, it is possible to determine whether the battery is discharging by monitoring the output current of the primary current source. Provided its output signal is zero, the battery must be discharging and supporting the electrical loads.

In a conventional vehicle with an alternator, a battery discharge is assumed by way of example when no output current is measured by the alternator. In practice, engine control strategies require a measurement of the alternator current in order to compensate for the mechanical load of the alternator. An estimation of the output current is made by an alternator with reference to the working cycle or absolute current thereof, and both types of information can be used to determine whether the battery is discharging. In the event of power supplies that have a DCDC converter as the primary source, an output signal that communicates the output current is often also available. The SOC identification algorithm may thus be implemented without a separate battery current sensor by monitoring the current from the alternator or the DCDC converter.

As previously described, the battery current is monitored once a voltage reduction occurs, in order to identify whether the state of charge the battery lies above or below a calibrated threshold. If the battery is discharging during the time required to discharge the virtual capacitors in the ZARC elements, a state of charge above the calibrated threshold is determined. The time during which the battery current is monitored should be slightly longer than the estimated discharge time of the capacitors in order to create sufficient conditions so that the state of charge can exceed the threshold.

The length of this monitoring window may be calculated online or may be calibrated as a fixed value. An online calculation here means a continuous determination and adaptation of the monitoring window on the basis of current variables relating to the battery state and battery measurements.

In the case of an online calculation the parameterization and the states of the model can be updated online with use of Kalman filters or other adaptive estimation methods in order to obtain the best approximation of the model to the actual battery states and measurements. The equivalent circuit diagram may then be used to estimate the discharge time of the capacitive parts of the virtual ZARC elements on the basis of the estimated or measured vehicle load current at any moment in time.

Figure 8:
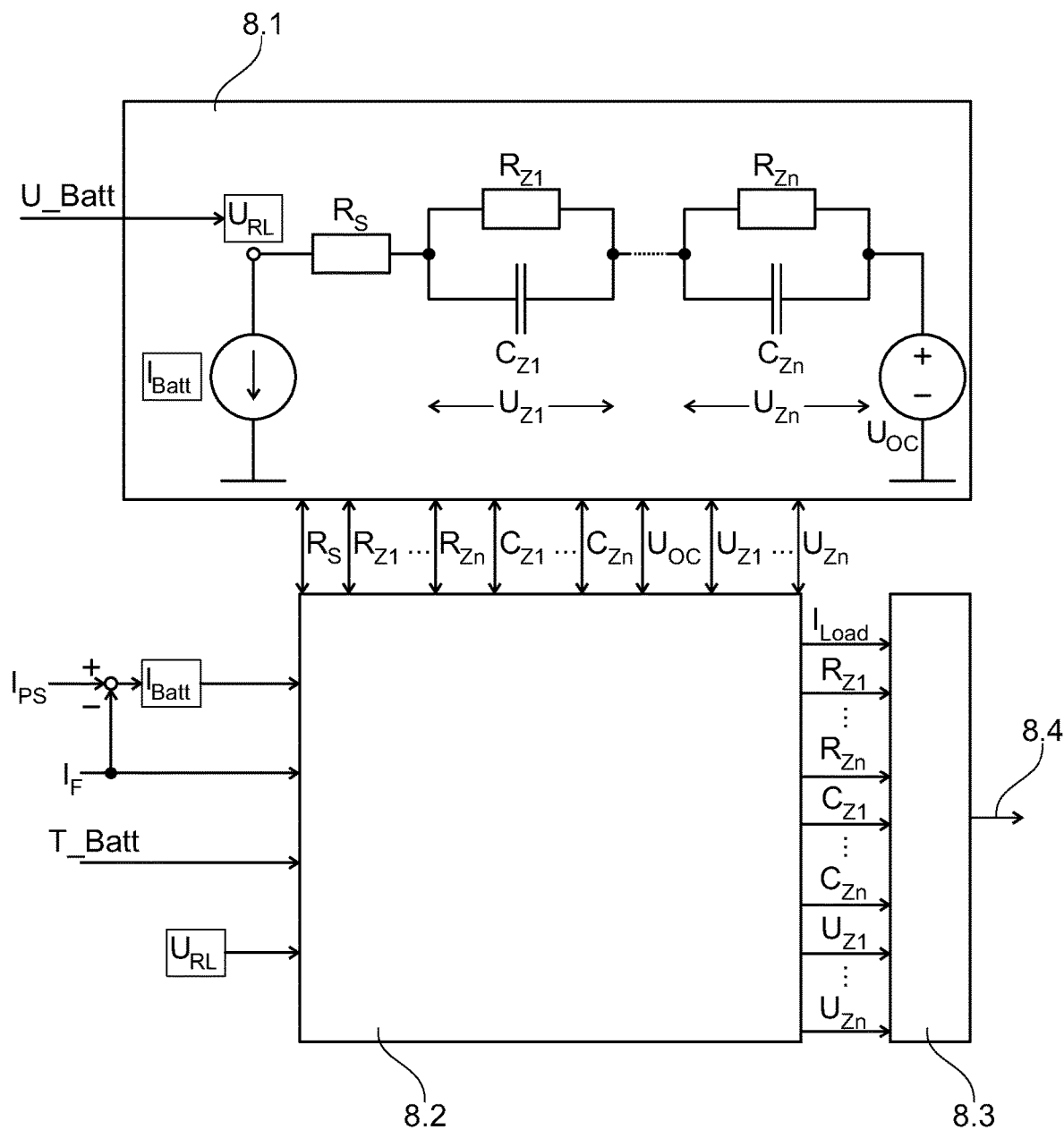
FIG. 8 shows a schematic illustration of the implementation of an online algorithm for estimating the discharge time of the virtual capacities on the basis of the measured vehicle load current at any moment in time.

FIG. 8 illustrates an implementation of the online algorithm for estimating the discharge time of the virtual capacitors on the basis of the measured vehicle load current at any moment in time. It should be noted that the equivalent circuit diagram used by the algorithm is generalized with n ZARC elements. The values of the ohmic and capacitive values of the ZARC elements and their associated states (voltages at the ZARC elements) are updated continuously and adaptively.

Figure 9:
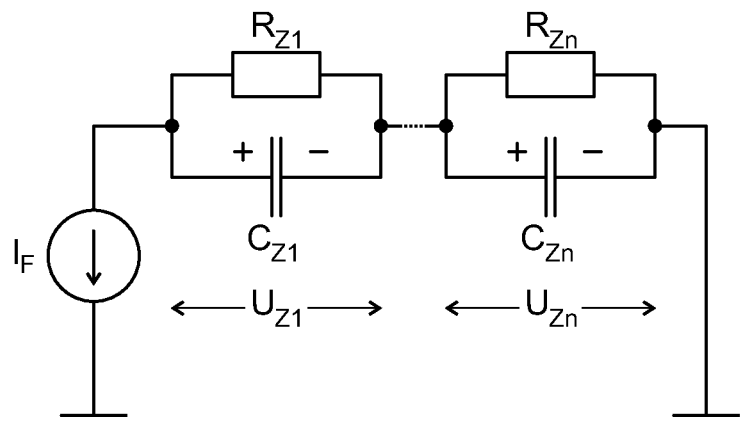
FIG. 9 shows the illustration of an equivalent circuit for calculating the discharge time.

The inputs into the battery model 8.1 are the measured or estimated battery AC side voltage U_Batt, the current $I_{PS}$ coming from the primary power supply (alternator or DCDC converter), the vehicle load overall current $I_F$, and the battery temperature T_Batt. The block 8.2 adaptively determines the parameterization and the states of the model and generates estimations for $R_{Z1} \ldots R_{Zn}$, $C_{Z1} \ldots C_{Zn}$, $U_{Z1} \ldots U_{Zn}$, and $U_{OC}$. The discharge time calculation block 8.3 assumes the updated values of the ohmic and capacitive values of the ZARC elements and their states for the start of a calculation cycle together with the assumption that the battery is discharged with the total vehicle current $I_F$. This scenario is illustrated in FIG. 9, where the polarity of the capacitors describes a charging current in the battery at the moment before the vehicle loads are applied. The discharge time block calculates the time until the polarity changes or until $$U_{Z1} = \ldots = U_{Zn} = 0. \quad (3)$$

This discharge time is output in step 8.4 as the value DisTime, as illustrated in FIG. 8. Similarly to the flag SOCMonFlag, which is set and reset by the algorithm triggering the voltage reductions, the discharge time is calculated continuously and is input directly following a voltage reduction into the identification algorithm monitoring the discharging current.

The discharge time may also be calculated offline with use of a battery model for a certain state of charge threshold and a temperature-dependent equalization charging voltage over a range of operating temperatures and load currents. It may additionally be measured on a conditioned battery during a series of bench tests. The results may be applied to a look-up table, which defines the discharge time DisTime with reference to the vehicle load current and the battery temperature.

A solution that assumes a constant discharge time, which is independent of temperature and load current, may likewise be implemented. As already described, the identification algorithm may be designed such that it is inherently conservative in that the monitoring period is selected such that it is greater than the actual discharge time of the virtual capacitors in the ZARC elements. This may thus result in a false positive identification of a state of charge below the threshold, however false negative identifications, which do not detect any low state of charge, are seldom. A minimal implementation can thus be applied, which uses a constant calibrated discharge period with the assumption that an occasional false positive identification of a low state of charge condition takes place. The elimination of a low state of charge usually lies in a complete charging of a battery, which does not have a significant effect on the vehicle power.

Figure 10:
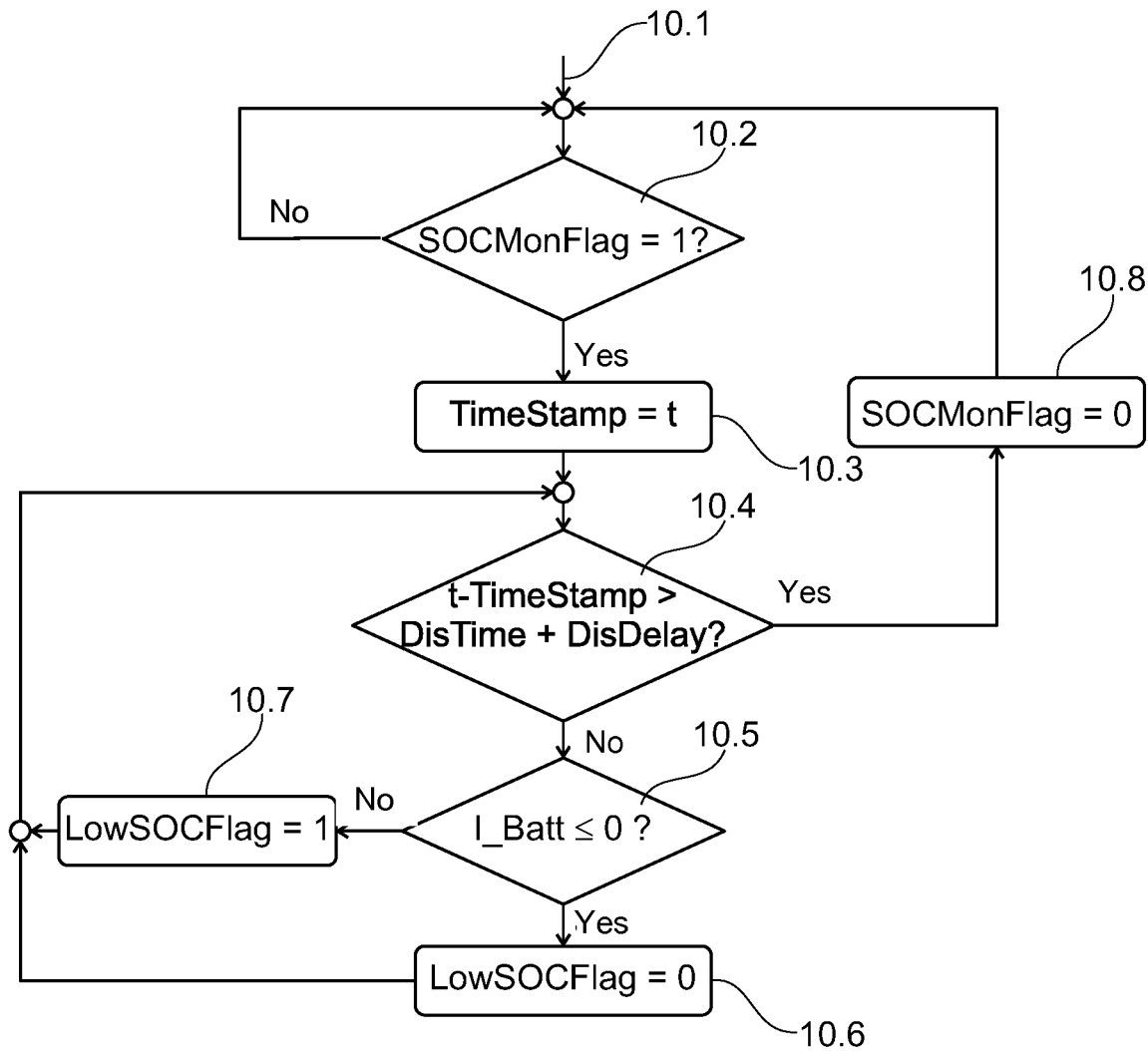
FIG. 10 shows a flow diagram of an algorithm for identifying a state of charge.

The identification algorithm monitors the battery current once a drop of the battery voltage occurs over a monitoring period. If only the discharging current is measured during the discharge period, it is determined that the state of charge lies above the calibrated threshold. If, however, no battery current or a charging current is measured during the monitoring period, it is determined that the state of charge lies below the calibrated threshold, and a low SOC flag is activated. FIG. 10 illustrates this state of charge identification algorithm.

The algorithm is activated in step 10.1 by means of the current source charging the battery. The identification process starts when a voltage reduction occurs, which is determined by a Low-to-High transition of the SOCMonFlag. The flag may be generated periodically via a timer, which additionally controls the voltage setpoint value, or it may be generated by an algorithm that signals changes to the voltage setpoint value by regenerative braking or selected charging strategies.

If the flag SOCMonFlag is at 1 (step 10.2), the identification process starts, and in step 10.3 a timestamp is set. Furthermore, the battery current IBatt is monitored. Provided a discharge takes place, it is determined that the state of charge of the battery lies above the calibrated threshold (steps 10.4 and 10.5) and the flag LowSOC is set to Low (step 10.6). If, however, during the identification process the discharging current falls to zero or a charging current is measured, it is determined that the state of charge lies below the calibrated threshold, and the LowSOC flag is set to High (step 10.7).

The identification process continues through the entire monitoring period, which is the sum of the estimated or calibrated discharge time DisTime and the calibrated parameter DisDelay. If the check in step 10.4 reveals that the time elapsed is greater than the sum of DisTime and DisDelay, SOCMonFlag is set to Low (step 10.8). The discharge time DisTime may be calculated online or may be calculated offline and defined as a function of the state of charge threshold, the load current and the temperature. In a minimal implementation the discharge time may be selected as a constant value.

The parameter DisDelay represents a period of time that is added to the estimated or calibrated discharge time in order to ensure that the monitoring period ends just after the actual discharge time. Here, the monitoring period preferably ends just after the actual discharge time in order to rule out false negative identifications of an actual low state of charge. In the event of a minimal implementation, the values of DisDelay and DisTime may also be combined to form a single calibration parameter.

The algorithm may be applied to the power supply management in order to trigger a problem-solving procedure when a low state of charge is detected or in order to activate defined vehicle functions when the state of charge exceeds a defined threshold. If a defined state of charge threshold is selected by equation (1) in order to distinguish between a high-power state of charge for the vehicle operation and a low state of charge, the algorithm can be used for example in order to trigger the problem-solving procedure via the LowSOC-Flag. If a low state of charge is determined, the operation of the battery should be terminated in the partially charged state. Equalization charging should be introduced until either a calibrated charging period has elapsed or subsequent state of charge identifications show that the state of charge has risen again above a calibrated threshold, which may be higher than that used to trigger a low state of charge in order to integrate a hysteresis into the problem-solving strategy.

The state of charge comparison method may also be implemented with a number of thresholds, which may be used to activate and to deactivate a number of operating modes. A threshold may be used for a comparison during any drop of the battery voltage. Depending on the application, the application of thresholds within a calibration set may be revolved, or a new threshold can be applied depending on the operating history of the vehicle or of the power supply system.

By way of example, a problem-solving procedure can be triggered in the case of a low state of charge with a lower state of charge than that required for stop-start operation. The application of a threshold for a low state of charge can take place with each second monitoring event, and the application for the activation of start-stop operation can take place during the remaining intermediate events. If a state of charge is determined between the two thresholds, start-stop operation can thus be deactivated without low SOC correction.

In a further embodiment separate state of charge thresholds can be set for the activation of low SOC correction, whilst the vehicle is travelling, and for the temporary deactivation of such a correction. This may be applied to a plug-in hybrid or electric vehicle in order to maximize the range in electric driving operation. In this case the threshold for detecting a low state of charge LowSOCThresh is applied periodically, whilst the vehicle is travelling, until a low state of charge condition is determined. When this occurs the problem-correction strategy is applied. The battery is thus charged with a temperature-dependent equalization voltage. Whilst this takes place during a journey, the state of charge is monitored occasionally with use of a second, higher threshold DelayMitThresh. If the state of charge is identified later as higher than DelayMitThresh, the entire correction of the low state of charge is delayed until the vehicle is charged again at the mains. In this case a partial SOC charging strategy may be continued the rest of the journey.

What is claimed is:

1. A battery monitoring system comprising:
   a controller programmed to decrease a charge voltage of a battery to a defined value to cause the battery to discharge responsive to a state of charge (SOC) of the battery being greater than a threshold and not discharge responsive to the SOC being less than the threshold; and
   an evaluation unit programmed to generate an alarm signal responsive to absence of discharge of the battery during the decrease of the charge voltage of the battery.

2. The system as claimed in claim 1, wherein the controller is further programmed to perform the battery charge decrease at scheduled intervals.

3. The system as claimed in claim 1, wherein the battery charge decrease lasts for a predefined duration.

4. A method for monitoring a state of charge of a battery of a motor vehicle comprising:
   transmitting to an evaluation unit battery current values determined at moments at which charging voltage of the battery is decreased to a defined limit value; and
   generating by the evaluation unit an alarm signal if no discharge of the battery is measured via the determined battery current values in a defined monitoring period, wherein the defined limit value is selected such that the battery discharges when a state of charge of the battery is above a defined threshold and does not discharge when the state of charge is below the defined threshold, and wherein the battery charging voltage is increased on account of a charging strategy if defined conditions are present, and the battery charging voltage is decreased to the defined limit value when the defined conditions are no longer present, the battery current values then being transmitted to the evaluation unit, which generates an alarm signal if no discharge of the battery is measured via the determined battery current values in a defined monitoring period.

5. The method as claimed in claim 4, wherein the battery current values are determined indirectly by measuring output current of a current source via which the battery is charged.

6. The method as claimed in claim 5, wherein the current source is a generator or a DCDC converter of the motor vehicle.

7. The method as claimed in claim 4, wherein the defined conditions include efficiency of energy conversion of a drivetrain of the motor vehicle exceeding a threshold efficiency or conditions for regenerative braking.

8. The method as claimed in claim 4, wherein the battery charging voltage is decreased in accordance with a schedule at regular intervals to the defined limit value, the battery current values then being transmitted to the evaluation unit, which generates an alarm signal if no discharge of the battery is measured via the determined battery current values in a predefined monitoring period.

9. The method as claimed in claim 4, wherein a measure for changing battery situation is introduced by a system of the motor vehicle when the evaluation unit generates an alarm signal.

10. The method as claimed in claim 9, wherein a measure for changing the battery situation includes initiation of a charging process of the battery to a maximum state of charge.

11. The method as claimed in claim 9, wherein within a charging strategy for the battery, in which a switch is made in accordance with a schedule at regular intervals between trickle charging and equalization charging, an unscheduled change from trickle charging to equalization charging is initiated.

12. The method as claimed in claim 4, wherein the monitoring period is a fixedly defined value or is adapted continuously to a current state of the battery.

13. A method of monitoring a battery in a vehicle comprising:
   by a controller,
      decreasing a charge voltage of the battery to a defined value to cause the battery to discharge responsive to a state of charge (SOC) of the battery being greater than an SOC threshold and not discharge responsive to the SOC being less than the SOC threshold, and
      generating an alarm signal based upon absence of discharge of the battery during a monitoring period.

14. The method as claimed in claim 13, wherein decreasing the charge voltage is performed at scheduled intervals.

15. The method as claimed in claim 13, wherein a duration of the monitoring period is predefined.

16. The method as claimed in claim 13, wherein a duration of the monitoring period is based on a state of the battery.

* * * * *